United States Patent
Huang et al.

(10) Patent No.: US 9,906,424 B2
(45) Date of Patent: *Feb. 27, 2018

(54) METHOD AND SYSTEM FOR STORAGE TRAFFIC MODELING

(71) Applicant: ProphetStor Data Services, Inc., Taichung (TW)

(72) Inventors: Ming Jen Huang, Taichung (TW); Chun Fang Huang, Taichung (TW); Tsung Ming Shih, Taichung (TW); Wen Shyen Chen, Taichung (TW)

( * ) Notice: Subject to any disclaimer, the term of this patent is extended or adjusted under 35 U.S.C. 154(b) by 686 days.

This patent is subject to a terminal disclaimer.

(21) Appl. No.: 14/290,533

(22) Filed: May 29, 2014

(65) Prior Publication Data

US 2015/0350050 A1  Dec. 3, 2015

(51) Int. Cl.
*H04L 12/26* (2006.01)
*H04L 29/08* (2006.01)
*H04L 12/24* (2006.01)

(52) U.S. Cl.
CPC ........ *H04L 43/0888* (2013.01); *H04L 41/147* (2013.01); *H04L 41/16* (2013.01); *H04L 67/1097* (2013.01)

(58) Field of Classification Search
CPC ... H04L 43/14; H04L 43/0888; H04L 41/147; H04L 41/16; H04L 67/1097
See application file for complete search history.

(56) References Cited

U.S. PATENT DOCUMENTS

| | | | |
|---|---|---|---|
| 2007/0288419 A1* | 12/2007 | Strassner | G06N 5/02 706/55 |
| 2010/0318736 A1* | 12/2010 | Balsubramanian, Sr. | G06F 11/3414 711/114 |
| 2013/0081005 A1 | 3/2013 | Gounares et al. | |
| 2014/0201425 A1* | 7/2014 | Clark | G06F 3/061 711/103 |
| 2015/0135012 A1* | 5/2015 | Bhalla | H04L 41/147 714/26 |
| 2015/0156122 A1* | 6/2015 | Singh | H04L 47/20 370/235 |
| 2015/0186256 A1* | 7/2015 | Cao | G06F 3/0605 711/154 |

(Continued)

OTHER PUBLICATIONS (Anil K. Jain et al., Artificial Neural Networks: A Tutorial, Mar. 1996, IEEE, 31-44).*

*Primary Examiner* — Omar F Fernandez Rivas
*Assistant Examiner* — Justin C Mikowski
(74) *Attorney, Agent, or Firm* — Che-Yang Chen; Law Offices of Scott Warmuth

(57) ABSTRACT

A method and system for storage traffic modeling in a Software Defined Storage (SDS) is disclosed. The method includes the steps of: collecting observed values of at least one performance parameter in a period of time from a storage node; learning a trend structure of the at least one performance parameter varying with time from the observed values; and providing a predicted value of one performance parameter in a particular point in time in the future. The storage node is operated by SDS software. The trend structure is adjusted based on observed values collected after the period of time. The predicted value is an output of the trend structure which has been adjusted.

19 Claims, 6 Drawing Sheets

(56) References Cited

U.S. PATENT DOCUMENTS

2015/0288573 A1* 10/2015 Baughman ............ H04L 41/147
706/52
2015/0317337 A1* 11/2015 Edgar ...................... G06N 5/02
707/751

* cited by examiner

METHOD AND SYSTEM FOR STORAGE TRAFFIC MODELING

FIELD OF THE INVENTION

The present invention relates to a method and a system for storage traffic modeling. More particularly, the present invention relates to a method and a system for storage traffic modeling in a Software Defined Storage (SDS).

BACKGROUND OF THE INVENTION

Cloud services had been very popular in the recent decade. Cloud services are based on cloud computing to provide associated services or commodities without increasing burden on client side. Cloud computing involves a large number of computers connected through a communication network such as the Internet. It relies on sharing of resources to achieve coherence and economies of scale. At the foundation of cloud computing is the broader concept of converged infrastructure and shared services. Among all the shared services, memory and storage are definitely the two having maximum demand. This is because some hot applications, such as video streaming, require huge quantity of data to be stored. Management of memories and storages while the cloud services operate is very important to maintain normal service quality for the clients.

For example, a server used for providing cloud services usually manages or links to a number of Hard Disk Drives (HDDs). Clients access the server and data are read from or written to the HDDs. There are some problems, e.g. latency of response, due to limitation of the HDD system. Under normal operation of HDD system, the latency is usually caused by requirements of applications (i.e. workload), as the required access speed is higher than that the HDD system can support. In the past, latency might not be a problem since service providers of cloud service can offer infrastructure for the maximum capacity that can be expected. However, with more and more clients joining and sharing resources of the services, the fixed infrastructure may not be able to support the increasing requirement from the clients. To improve and strengthen the infrastructure, a flexible adjustment of the infrastructure is needed, in addition to only preparing more hardware. It is not economical to put all resources just for an unsure situation that might happen at a point of time in the future.

Another increasing demand as well as the cloud service is software defined storage. Software defined storage refers to computer data storage technologies which separate storage hardware from the software that manages the storage infrastructure. The software enabling a software defined storage environment provides policy management for feature options, such as deduplication, replication, thin provisioning, snapshots, and backup. With software defined storage technologies, the requirement of flexible adjustment of infrastructure can be fulfilled. Sufficient resources of the infrastructure can be used on time while unused hardware in the infrastructure can be standbys in order to save power consumption and prolong hardware life cycle. Besides the flexible adjustment of infrastructure, if the system can predict the storage traffic in the near future and adjust itself accordingly to match the requirements, the system can better serve the clients. In other words, it is high demand for a system being capable of predicting workload in a particular point in time in the future, and that is called traffic modeling. The storage traffic modeling is especially the main interest in this invention.

With reference to US Patent Publication No. 20090138420 which discloses a useful invention for the demand mentioned above. A method is for modeling network traffic in which an artificial neural network architecture is utilized in order to intelligently and adaptively model the capacity of a network. Initially, the network traffic is decomposed into a number of categories, such as individual users, application usage, or common usage groups. Inputs to one artificial neural network are then defined such that a respective combination of inputs permits prediction of bandwidth capacity needs for that input condition. Outputs of that artificial neural network are representative of the network traffic associated with the respective inputs. For example, a number of bandwidth profiles associated with respective categories may be defined. An artificial neural network is then constructed and trained with those bandwidth profiles and then utilized to predict future bandwidth needs for the network.

Application of artificial neural network for prediction of bandwidth profiles is the key portion in the invention. Detailed processes for implementing the invention are disclosed. However, the invention is basically used for prediction of bandwidth profiles for flights according to the embodiments. Under this situation, the infrastructure for the network traffic is almost fixed with just different workloads, e.g. passengers use the infrastructure from different group. Without linking to any cloud service, its hardware of infrastructure may be adjusted according to different workloads. Meanwhile, prediction of requirements of applications for a cloud service is not easily done by learning data from different categories. Precisely, the prediction should be made based on different performance parameters from one source. For example, by learning Input/output Operations Per Second (IOPS) of a hard disc drive (HDD) system and latency in a period of time in the past time to predict IOPS in the future.

Therefore, a new method and system for predicting storage traffic and providing a traffic modeling for a storage defined storage system based on an artificial neural network is still desired.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

According to an aspect of the present invention, a method for storage traffic modeling in a Software Defined Storage (SDS) includes the steps of: collecting observed values of at least one performance parameter in a period of time from a storage node; learning a trend structure of the at least one performance parameter varying with time from the observed values; and providing a predicted value of one performance parameter in a particular point in time in the future. The storage node is operated by SDS software. The trend structure is adjusted based on observed values collected after the period of time. The predicted value is an output of the trend structure which has been adjusted. The performance parameter comprises Input/output Operations Per Second (IOPS), latency, throughput, and queue.

The method further includes the steps of: comparing one outputted predicted value with one compared observed value of the performance parameter in the particular point in time; and adjusting the trend structure so that another predicted value from the adjusted trend structure for the same particular point in time is closer to the compared observed value.

Preferably, the trend structure has a hidden element and an output element. The hidden element is constructed by using multiple nodes each built by finding out weights and a first bias value and setting a first activation function, and operated by multiplying the weights with the observed values or the predicted value, adding the results of multiplications to the first bias value as a sum, inputting the sum to the first activation function, and generating a transition value from the first activation function. The trend structure is adjusted by amending at least one of the weights, the first bias value, and/or parameters of the first activation function. In the present invention, the first activation function is a sigmoid function. However, practically it is not limited to the sigmoid function and can be other kind of functions, including linear function, tan h function, signum function, or step function. A suitable one will be used to have a best predicting result.

The output element is built by finding out a weight and a second bias value and setting a second bias value, and operated by multiplying the weight with the transition value of each neural node of the hidden element, adding the result of multiplication to the second bias value as a sum, inputting the sum to the second activation function, and generating the predicted value from the second activation function. Thus, the trend structure is adjusted by amending the weight, the second bias value and/or parameters of the second activation function. The second activation function is usually a linear function, but can be other kind of functions, including sigmoid function, tan h function, signum function, or step function.

According to another aspect of the present invention, a system for storage traffic modeling in a Software Defined Storage (SDS) includes: a traffic monitoring module, for collecting observed values of at least one performance parameter in a period of time from a storage node; and a neural network prediction module, learning a trend structure of the at least one performance parameter varying with time from the observed values and providing a predicted value of one performance parameter in a particular point in time in the future. The storage node is operated by SDS software. The trend structure is adjusted based on observed values collected after the period of time. The predicted value is an output of the trend structure which has been adjusted. The performance parameter comprises IOPS, latency, throughput, and queue.

The neural network prediction module further comparing one outputted predicted value with one compared observed value of the performance parameter in the particular point in time, and adjusting the trend structure so that another predicted value from the adjusted trend structure for the same particular point in time is closer to the compared observed value. Preferably, the trend structure has a hidden element and an output element.

The hidden element multiplies weights with the observed values or one predicted value from the output element, adding the results of multiplications to a first bias value as a sum, inputting the sum to the first activation function, and generating a transition value from the first activation function.

The output element multiplies a weight with the transition value of each neural node of the hidden element, providing a second bias value, adding the result of the multiplication to the second bias value as a sum, and inputting the sum to the second activation function. The trend structure is adjusted by amending the weigh, the second bias value, and/or parameters of the first or second activation function. In the present invention, the first activation function is a sigmoid function. However, it is not limited to the sigmoid function practically and can be other kind of functions, including linear function, tan h function, signum function, or step function. The second activation function is usually a linear function, but can be other kind of functions, including sigmoid function, tan h function, signum function, or step function.

The traffic monitoring module or neural network prediction module is hardware or software executing on at least one processor in the storage node.

DETAILED DESCRIPTION OF THE PREFERRED EMBODIMENTS

The present invention will now be described more specifically with reference to the following embodiments.

Figure 1:
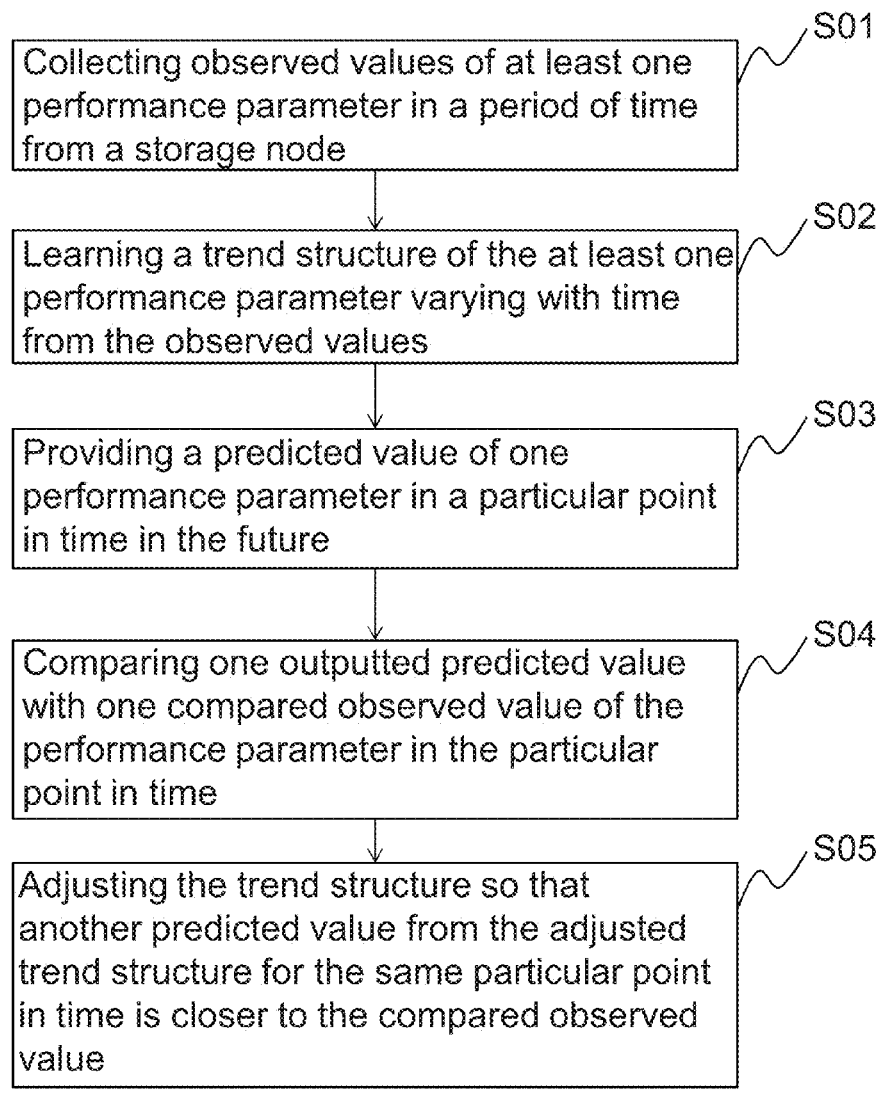
FIG. 1 is a flow chart of a method for storage traffic modeling according to the present invention.
Figure 2:
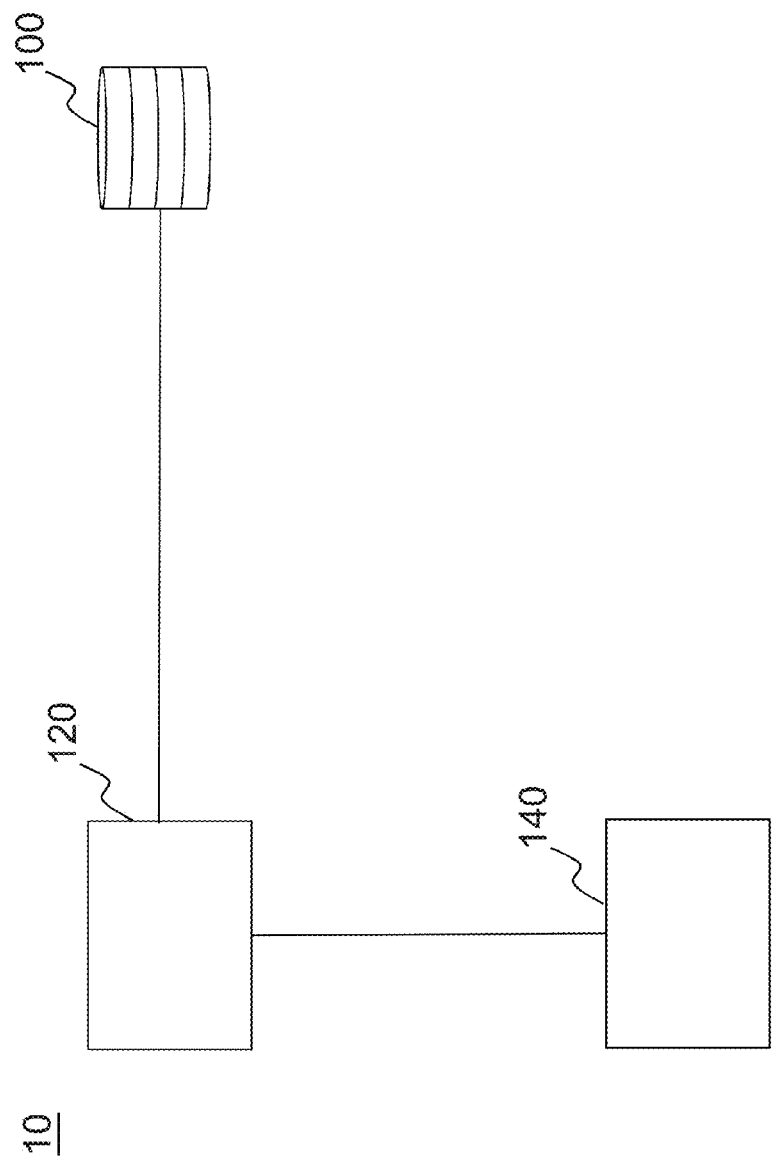
FIG. 2 illustrates a system for storage traffic modeling in an embodiment according to the present invention.

Please refer to FIG. 1 to FIG. 4. An embodiment is disclosed. FIG. 1 is a flow chart of a method for storage traffic modeling according to the present invention. FIG. 2 illustrates a system 10 applying the method in the embodiment. The system 10 can be used to predict performance parameters, such as Input/output Operations Per Second (IOPS), latency, throughput, and queue for a software defined storage (SDS) system in a network.

Figure 3:
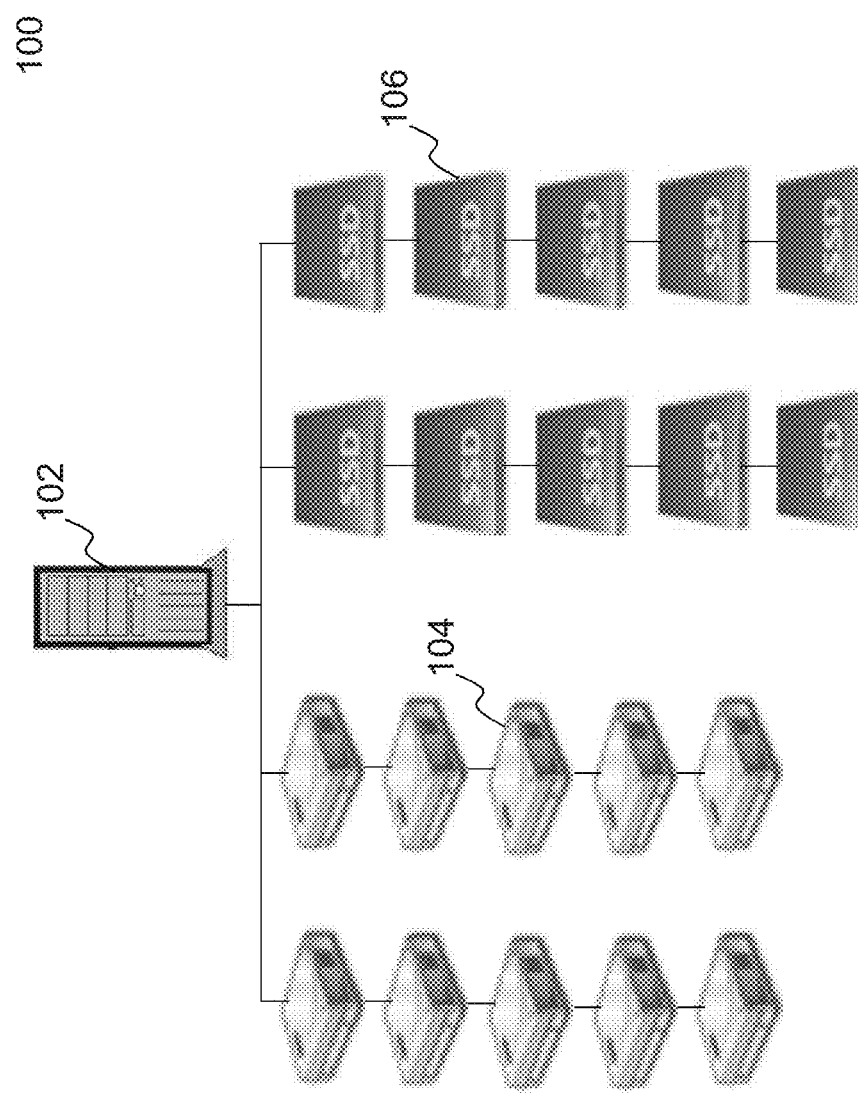
FIG. 3 shows an architecture of a storage node.

In this embodiment, the SDS system is a storage node 100. The network may be internet. Thus, the storage node 100 may be a database server managing a number of storages and providing cloud services to clients. The storage node 100 may also be a file server or a mail server with storages for private use. The network can thus be a Local Area Network (LAN) for a lab or a Wide Area Network (WAN) for a multinational enterprise, respectively. Application of the storage node 100 is not limited by the present invention. However, the storage node 100 must be a SDS. In other words, the hardware (storage devices) of the storage node 100 should be separated from the software which manages the storage node 100. The storage node 100 is operated by SDS software. Hence, reconfiguration of the storage devices in the storage node 100 can be available by individual software or hardware. Conventionally, the storage node 100 may be composed of a managing server 102, a number of hard disc drives (HDD) 104 and solid state drives (SSD) 106 as shown in FIG. 3. The managing server 102 can receive commands to processes reconfiguration of the HDDs 104 and SSDs 106. Therefore, only a portion of HDDs 104 and SSD 106 are used for specified requirements of applications i.e. workload). Power can be saved since the rest hardware of the system 10 is standby. The present invention can not only be applied to the storage node 100 with variable reconfiguration of storage, but also to a storage node with fixed infrastructure.

The system 10 includes a traffic monitoring module 120 and a neural network prediction module 140. It should be noticed that the traffic monitoring module 120 or the neural network prediction module 140 is not limited to hardware only. They may be software executing on at least one processor in the storage node 100. The neural network prediction module 140 can be operated based on any neural network technique. The present invention implements the neural network technique for SDS system to provide prediction of performance parameters so that a traffic modeling can be available.

The traffic monitoring module 120 is used to collect observed values of at least one performance parameter in a period of time from the storage node 100. As mentioned above, the performance parameter may be an IOPS, latency, throughput, or queue in the storage node 100. In this embodiment, observed values of one performance parameter, for example latency, are collected for learning by the neural network prediction module 140 and predicted values of latency, can be provided in a particular point in time in the future. According to the present invention, the observed values of performance parameter can be used to predict values of themselves in the particular point in time in the future. In another embodiment which will be described later, predicted values of multi-performance parameters can be used to predict values of one performance parameter in the particular point in time in the future.

Precisely, the neural network prediction module 140 learns a trend structure of the at least one performance parameter which varies with time from the observed values. Based on the results of learning, predicted values of one performance parameter are provided in a particular point in time in the future. As mentioned above, the observed values and the predicted values are both latency. The neural network prediction module 140 may compare one outputted latency with one compared observed value of latency in the particular point in time. It can adjust the trend structure so that another predicted value of latency from the adjusted trend structure for the same particular point in time is closer to the compared observed value. For example, when a latency predicted 30 seconds later is 2.0 seconds based on the observed values of latency during past 120 seconds, a compared latency 30 seconds later is 2.5 seconds. Thus, the trend structure must be adjusted. As inferred from the description above, the trend structure may be hardware or software executing on at least one processor in the storage node 100. No matter what form it is, in order to have a better understanding, the trend structure is specified in FIG. 4.

Figure 4:
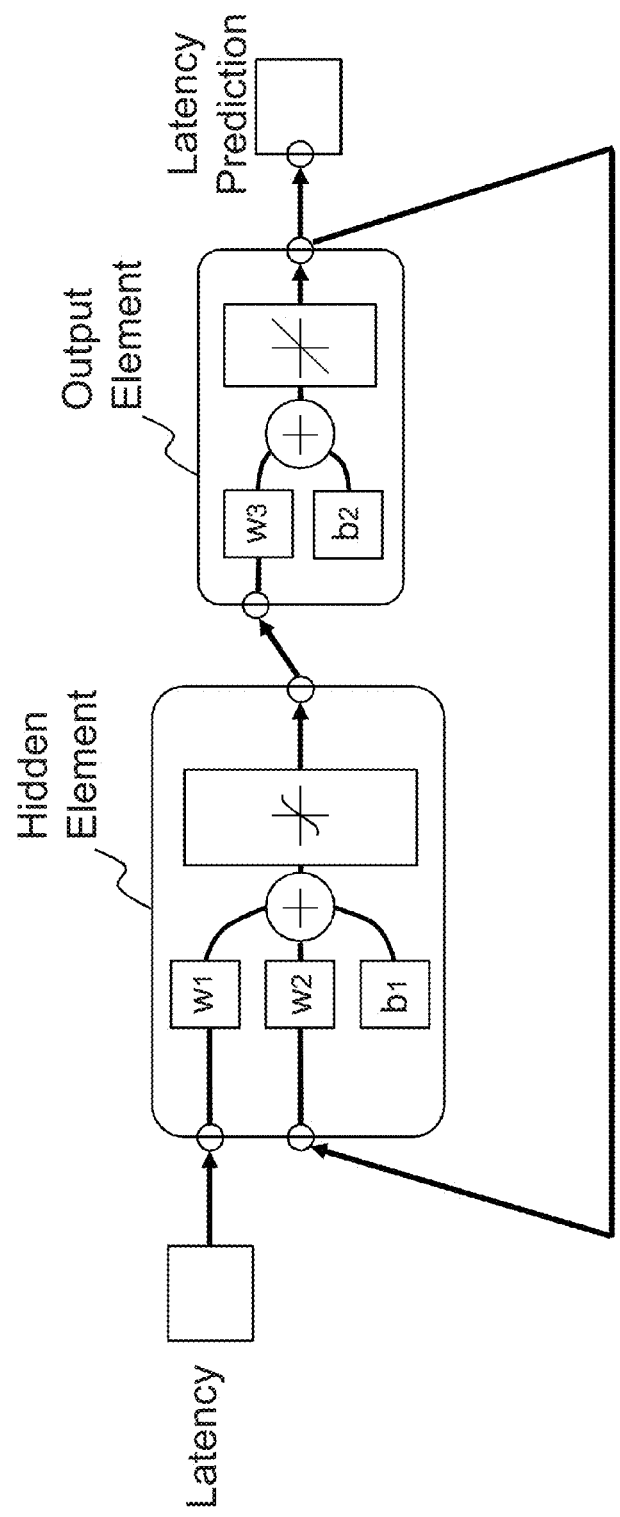
FIG. 4 illustrates a trend structure in the system in an embodiment.

As shown in FIG. 4, the trend structure includes a hidden element and an output element. The hidden element is constructed by using multiple neural nodes. Each neural node multiplies weights with the observed values or one predicted value from the output element. In this embodiment, there are two neural nodes in the hidden element. In fact, the number of neural nodes can be more than 2. More performance parameters can be used to predict one specified performance parameter in the future. This will be illustrated in another embodiment later. One neural node multiplies observed values of latency with a group of weights w1 and the other multiplies predicted values of latency with a group of weights w2. Meanwhile, the hidden element can add the results of multiplications mentioned above to a first bias value, b1, as a sum and input the sum to the first activation function to generate a transition value from the first activation function. In the present invention, the first activation function is a sigmoid function. However, practically it is not limited to the sigmoid function and can be other kind of functions, including linear function, tan h function, signum function, or step function. A suitable one will be used to have a best predicting result. Thus, the output element can use the transition value for further calculation.

The output element multiplies a weight, w3, with the transition value of each neural node of the hidden element and provides a second bias value, b2. It adds the result of multiplication to b2 as a sum, inputs the sum to the second activation function, and then generates the predicted value from the second activation function. The second activation function is usually a linear function, but can be other kind of functions, including sigmoid function, tan h function, signum function, or step function.

As mentioned above, the trend structure can be adjusted. The trend structure is adjusted by amending at least one of the weights, the first bias value, the second bias value and/or parameters of the first activation function or second activation function. Amended quantities may be chosen by experience or other calculations. Any method is possible as long as another predicted value from the adjusted trend structure for the same particular point in time is closer to the compared observed value. However, the trend structure must be adjusted based on observed values collected after the period of time. For this, another embodiment will be discussed later. Thus, the predicted value is an output of the trend structure which has been adjusted.

Come back to FIG. 1. According to the description above, a method for storage traffic modeling according to the present invention can be concluded. The method includes the steps of: collecting observed values of at least one performance parameter in a period of time from a storage node (S01); learning a trend structure of the at least one performance parameter varying with time from the observed values (S02); and providing a predicted value of one performance parameter in a particular point in time in the future (S03). The method can be applied for the storage node is operated by SDS software. The trend structure can be adjusted based on observed values collected after the period of time. The predicted value is an output of the trend structure which has been adjusted. IOPS, latency, throughput, and queue are included in the performance parameter.

In order to get a more precise predicted value, the method further includes the steps of comparing one outputted predicted value with one compared observed value of the performance parameter in the particular point in time (S04); and adjusting the trend structure so that another predicted value from the adjusted trend structure for the same particular point in time is closer to the compared observed value (S05).

Based on the method, we can further define a hidden element and an output element in the trend structure. The hidden element is constructed by using multiple nodes each is built by finding out weights and a first bias value and setting a first activation function. It is operated by multiplying the weights with the observed values and the predicted value, adding the results of multiplications to the first bias value as a sum, inputting the sum to the first activation function, and generating a transition value from the first activation function. The output element is built by finding out a weight and a second bias value and setting a second bias value. It is operated by multiplying the weight with the transition value of each neural node of the hidden element, adding the result of multiplication to the second bias value as a sum, inputting the sum to the second activation function, and generating the predicted value from the second activation function.

In the embodiment, the first activation function is a sigmoid function and the second activation function is a linear function. They may be other kind of functions, including sigmoid function, tan h function, signum function, or step function. The trend structure is adjusted by amending at least one of the weights, the first bias value, the second bias value and/or parameters of the first activation function or second activation function.

According to the spirit of the present invention, the collected observed value and the predicted value can be of the same performance parameter. Another embodiment is used to illustrate this point. Please refer to FIG. 5. Observed values of latency in the past are collected and a trend structure is obtained. The observed values are collected from $0^{th}$ second to $30^{th}$ second. After learning, the neural network prediction module is able to provide prediction for latency in a particular point in time in the future. Let the predicted value is made for $31^{st}$ second. After another observed value of latency on $31^{st}$ second is obtained, the observed value is compared with predicted value. As mentioned above, the difference is used to adjust the trend structure. It may be the weights or any of the bias value is changed. On $32^{st}$ second, another comparison and adjustment are keeping going on. After try and error, on the $50^{th}$ second, the trend structure starts to predict latency after the $50^{th}$ second. Of course, the time set in this embodiment, e.g. $31^{st}$ second and $50^{th}$ second, is not limited when the present invention is applied. It can be any time for any system.

Figure 5:
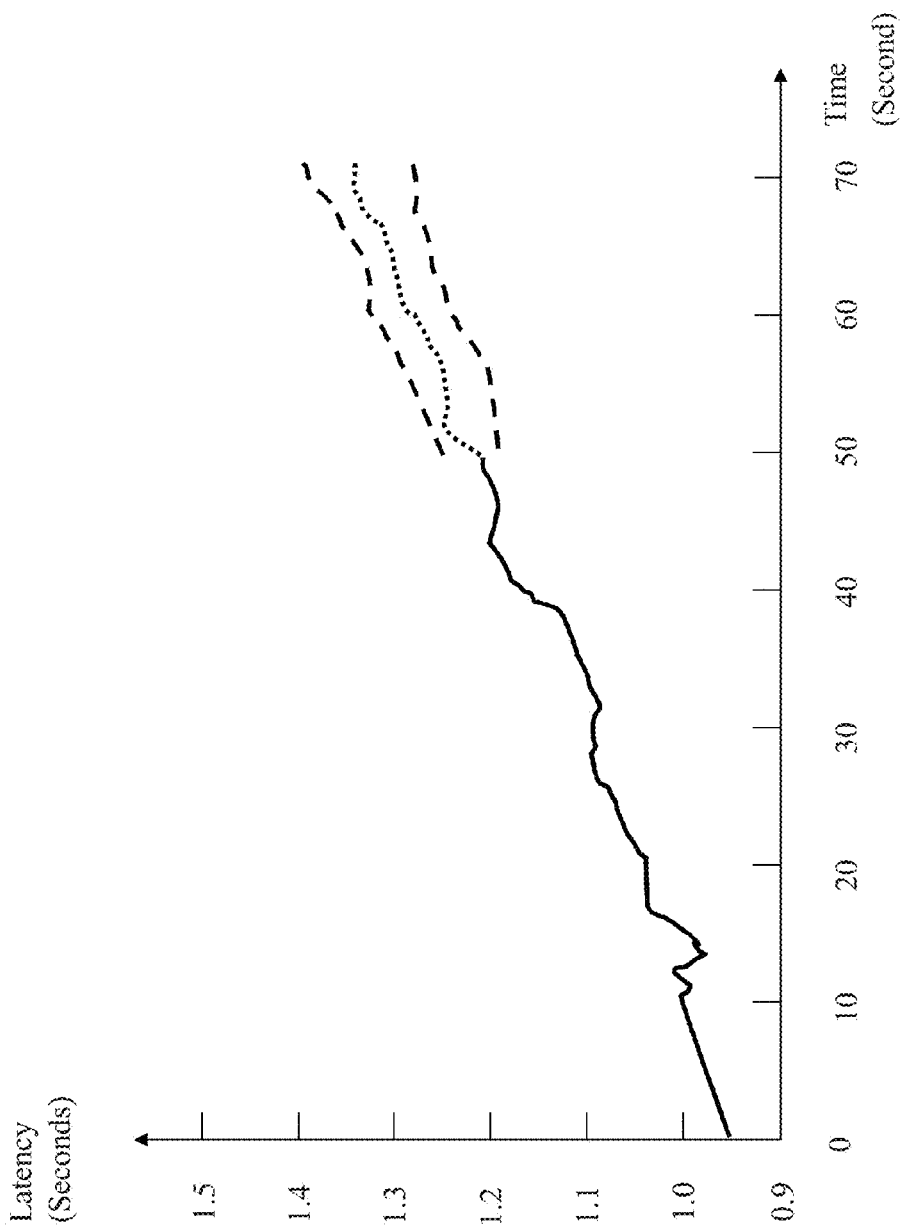
FIG. 5 depicts collected observed values for learning and predicted values by the system.

Predicted values of latency from the trend structure are marked in dots in FIG. 5. OF course, the trend structure may safely provide an upper bound and a lower bound (shown by the dashed lines) for its prediction. User may have references for their use of the predicted values. It should be noticed that the trend structure is still learning and adjusting by newly collected observed values after the $50^{th}$ second. Namely, learning and adjusting never stops after prediction begins.

Figure 6:
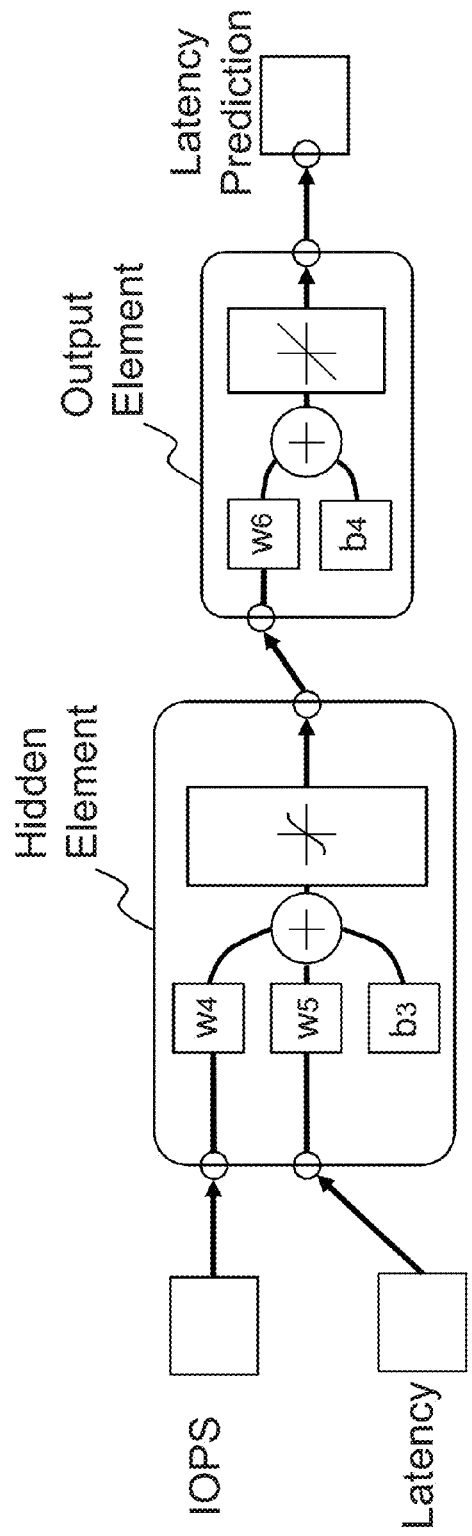
FIG. 6 illustrates another trend structure in the system in an embodiment.

According to the spirit of the present invention, observed values of multi-performance parameters can be collected to predict values of one performance parameter in the future. Meanwhile, weights of the hidden element may not necessarily multiply with the predicted value from the output element. Please refer to FIG. 6. There are two performance parameters, IOPS and latency, are used to predict latency in the future. The hidden element includes two neural nodes. One multiplies observed values of IOPS with a group of weights w4 and the other multiplies observed values of latency with a group of weights w5. Then, the hidden element adds the results of multiplications mentioned above to a first bias value, b3, as a sum and inputs the sum to the first activation function to generate a transition value. In the embodiment, the first activation function is a sigmoid function or may be other kind of functions, including linear function, tan h function, signum function, or step function. The observed values of IOPS replace the predicted value from the output element in the embodiment mentioned above. Functions of the output element are not changed. The output element multiplies a weight, w6, with the transition value of each neural node of the hidden element and adds the result of multiplication to a second bias value, b4 as a sum. It further inputs the sum to the second activation function and generates the predicted value from the second activation function.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method for managing a Software Defined Storage (SDS) including a plurality of storage devices which are operated by storage traffic modeling of SDS software, comprising the steps of:
   collecting observed values of at least one performance parameter of the plurality of storage devices in a period of time by a traffic monitoring module;
   sending the observed values to an artificial neural network prediction module;
   generating a trend structure of the at least one performance parameter varying with time based on the observed values received from the traffic monitoring module;
   obtaining a predicted value of the at least one performance parameter in a particular point in time in the future;
   comparing the predicted value with the observed value of the at least one performance parameter in the particular point in time;
   adjusting the trend structure to obtain another predicted value so that the another predicted value is closer to the observed value for the same particular point in time;
   providing the adjusted trend structure including the another predicted value to the SDS by the artificial neural network prediction module; and
   reconfiguring the plurality of storage devices of the SDS according to the adjusted trend structure to optimize utilization of the SDS.

2. The method according to claim 1, wherein the performance parameter comprises Input/output Operations Per Second (IOPS), latency, throughput, and queue.

3. The method according to claim 1, wherein the trend structure has a hidden element and an output element.

4. The method according to claim 3, wherein the hidden element is constructed by using multiple neural nodes each built by finding out weights and a first bias value and setting a first activation function, and operated by multiplying the weights with the observed values or the predicted value, adding the results of multiplications to the first bias value as a sum, inputting the sum to the first activation function, and generating a transition value from the first activation function.

5. The method according to claim 4, wherein the trend structure is adjusted by amending at least one of the weights, the first bias value, and/or parameters of the first activation function.

6. The method according to claim 4, wherein the first activation function is a sigmoid function, linear function, tan h function, signum function, or step function.

7. The method according to claim 3, wherein the output element is built by finding out a weight and a second bias value and setting a second bias value, and operated by multiplying the weight with the transition value of each neural node of the hidden element, adding the result of multiplication to the second bias value as a sum, inputting the sum to the second activation function, and generating the predicted value from the second activation function.

8. The method according to claim 7, wherein the trend structure is adjusted by amending the weight, the second bias value and/or parameters of the second activation function.

9. The method according to claim 7, wherein the second activation function is a sigmoid function, linear function, tan h function, signum function, or step function.

10. A system for managing a Software Defined Storage (SDS) including a plurality of storage devices which are operated by storage traffic modeling of SDS software, comprising:
- a traffic monitoring module, connected to the SDS, for collecting observed values of at least one performance parameter of the plurality of storage devices in a period of time; and
- an artificial neural network prediction module, connected to the traffic monitoring module, for generating a trend structure of the at least one performance parameter varying with time based on the observed values collected by the traffic monitoring module; obtaining a predicted value of the at least one performance parameter in a particular point in time in the future; comparing the predicted value with the observed value of the at least one performance parameter in the particular point in time; adjusting the trend structure to obtain another predicted value so that the another predicted value is closer to the observed value for the same particular point in time; providing the adjusted trend structure including the another predicted value to the SDS by the artificial neural network prediction module; and reconfiguring the plurality of storage devices of the SDS according to the adjusted trend structure to optimize utilization of the SDS.

11. The system according to claim 10, wherein the performance parameter comprises IOPS, latency, throughput, and queue.

12. The system according to claim 10, wherein the trend structure has a hidden element and an output element.

13. The system according to claim 12, wherein the hidden element is constructed by using multiple neural nodes each multiplying weights with the observed values or one predicted value from the output element, adding the results of multiplications to a first bias value as a sum, inputting the sum to the first activation function, and generating a transition value from the first activation function.

14. The system according to claim 13, wherein the trend structure is adjusted by amending at least one of the weights, the first bias value, and/or parameters of the first activation function.

15. The system according to claim 13, wherein the first activation function is a sigmoid function, linear function, tan h function, signum function, or step function.

16. The system according to claim 12, wherein the output element multiplies a weight with the transition value of each neural node of the hidden element, provides a second bias value, adding the result of the multiplication to the second bias value as a sum, and inputs the sum to the second activation function to generate the predicted value from the second activation function.

17. The system according to claim 16, wherein the trend structure is adjusted by amending the weigh, the second bias value, and/or parameters of the second activation function.

18. The system according to claim 16, wherein the second activation function is a sigmoid function, linear function, tan h function, signum function, or step function.

19. The system according to claim 10, wherein the traffic monitoring module or the artificial neural network prediction module is hardware or software executing on at least one processor in the storage node.

* * * * *